United States Patent [19]

Morin

[11] 4,363,594
[45] Dec. 14, 1982

[54] PIPE SECTION POSITIONING APPARATUS
[75] Inventor: Andre Morin, Clovis, Calif.
[73] Assignee: Perini Corporation, Mendota, Calif.
[21] Appl. No.: 162,632
[22] Filed: Jun. 24, 1980
[51] Int. Cl.$^3$ ............................................. B66F 11/00
[52] U.S. Cl. .................................... 414/747; 414/564
[58] Field of Search ............... 414/745, 747, 589, 564; 405/154, 174, 177

[56] References Cited
U.S. PATENT DOCUMENTS 3,267,682  8/1966  Robley ........................... 414/747 X
3,956,901  5/1976  Brown ............................ 414/747 X Primary Examiner—Sherman D. Basinger
Attorney, Agent, or Firm—Douglas W. Wyatt

[57] ABSTRACT

A pipe section positioning apparatus may be located partially below ground surface level, for example, in a trench to accurately lower and position heavy pipe sections, for example, concrete drain pipe sections, under control of a single operator who has an unobstructed view of the interior of the apparatus. The apparatus includes a body which may be positioned partially beneath ground level, an operator's platform attached to the body above ground level, an elevator within the body, a pipe cradle which is raised and lowered by the elevator and which temporarily holds a pipe section, a horizontally aligned track which is partially positioned beneath the pipe cradle to receive the pipe section and which is horizontally aligned, a ram which moves the pipe section horizontally on the track, and a pipe clamp assembly which clamps the pipe section and which then may be moved, under operator control, horizontally to accurately position and pipe section so that it may be joined with a previously laid pipe section.

8 Claims, 5 Drawing Figures

PIPE SECTION POSITIONING APPARATUS

BACKGROUND OF THE INVENTION

The present invention relates to construction machinery and more particularly to an apparatus for positioning pipe sections.

At the present time the conventional method of laying heavy pipe involves first digging an elongated trench whose width is considerably greater than the diameter of the pipe. In many cases the pipe sections are of considerable size, for example, they may have an exterior diameter of $12\frac{1}{4}$ to 29 inches and their weight may be 122 lbs. to 870 lbs. At the same time, they do not have great resistance to shock; they may be made of concrete or concrete mixtures.

The pipe sections may be transported to the construction site on a flat bed trailer or other type of truck. They are then lifted from the vehicle utlizing a crane, and positioned on the ground surface near the trench. When the pipe section is to be installed, it is again lifted by a crane and, using hand labor, it is lowered onto the trench and swung into position to be joined to the previously laid pipe section. This procedure is both time-consuming and expensive, since it utilizes a number of construction workers and at least one piece of heavy construction equipment, for example, a crane which could be used on other jobs.

OBJECTIVES AND FEATURES OF THE INVENTION

It is an objective of the present invention to provide an apparatus to lower a heavy pipe section below ground level and position that pipe section accurately with respect to a previously laid pipe section.

It is a further objective of the present invention to provide such a pipe positioning apparatus which may be controlled by a single operator whose operator platform is above ground level and in which the operator has an unobstructed view of the sequence of manipulations performed by the apparatus.

It is a still further objective of the present invention that the apparatus be of rugged construction, preferably utilizing hydraulic power for all its motive means, and may be moved from time to time utilizing a crane and truck flat bed trailer.

It is a still further objective of the present invention to provide such a pipe positioning apparatus which is sufficiently narrow in width so that its bottom portion may be lowered into a trench dug by conventional trench-digging machines.

It is a still further objective of the present invention to provide such a pipe positioning apparatus in which the heavy pipe sections, which may weigh, for example, from 122 to 870 lbs., are carefully handled so that they do not chip or break and yet are handled with rapidity and with low labor costs relative to prior known methods.

It is a feature of the present invention to provide an apparatus for positioning a pipe section, for example, a heavy section of a concrete drain pipe, so that it may be joined with a previously positioned pipe section. The apparatus of the present invention comprises a body adapted to be positioned particularly below ground level, for example, in a trench, the body having opposed side walls, end walls and a bottom wall. An elevator is positioned within the body and a pipe cradle is moved by the elevator and removably holds a pipe section. The pipe cradle has a pipe cradle control means which under operator determination controls the pipe cradle to hold and release a pipe section. An elevator motor means, such as a rotary hydraulic motor, operates the elevator and raises and lowers the pipe cradle. Elevator controls means, under operator determination, controls the elevator motor means.

The apparatus further comprises a horizontally aligned track, for example, having opposed rows of freely rotatable wheels, within the body and partly positioned beneath the elevator to receive and support a pipe section deposited from the pipe cradle. Ram means within the body moves the pipe section along the track and ram motor means, for example, a hydraulic cylinder and piston, operates the ram means. Ram control means, under operator determination, controls the ram motor means. A pipe clamp assembly, within the body, is positioned at least partially over the track to removably fasten on a pipe section. The pipe clamp assembly comprises clamp means to close and hold the pipe section and to open and release the pipe section, and a pipe clamp motor means, such as a hydraulic cylinder and piston, to open and close the clamp means. Pipe clamp control means, under operator determination, controls the pipe clamp motor means. A pipe clamp assembly motion means, under operator control, moves the pipe clamp assembly to position the clamped pipe section.

DETAILED DESCRIPTON OF THE INVENTION

Figure 1:
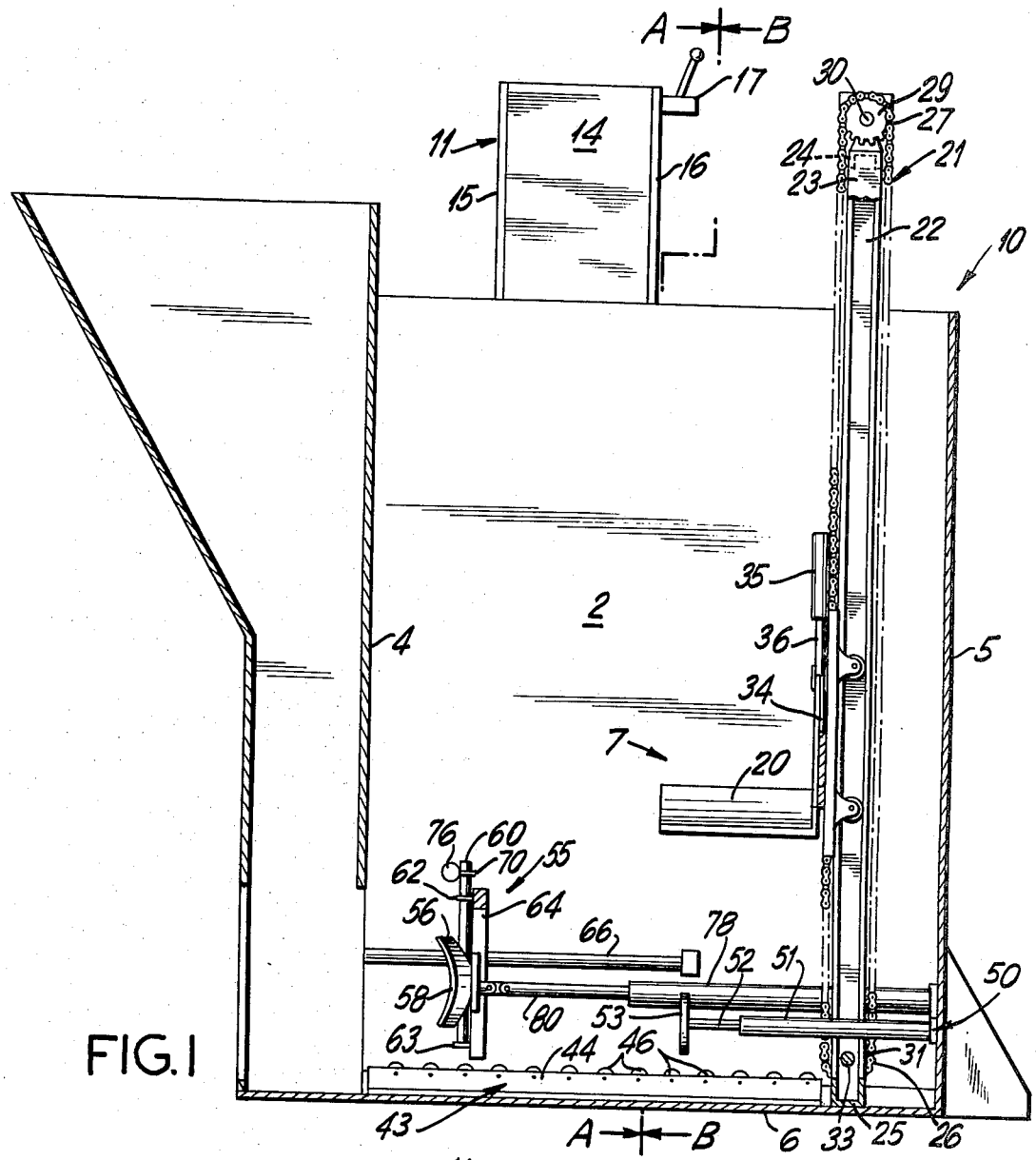
FIG. 1 is a side cross-sectional view of the pipe section positioning apparatus of the present invention.
Figure 2:
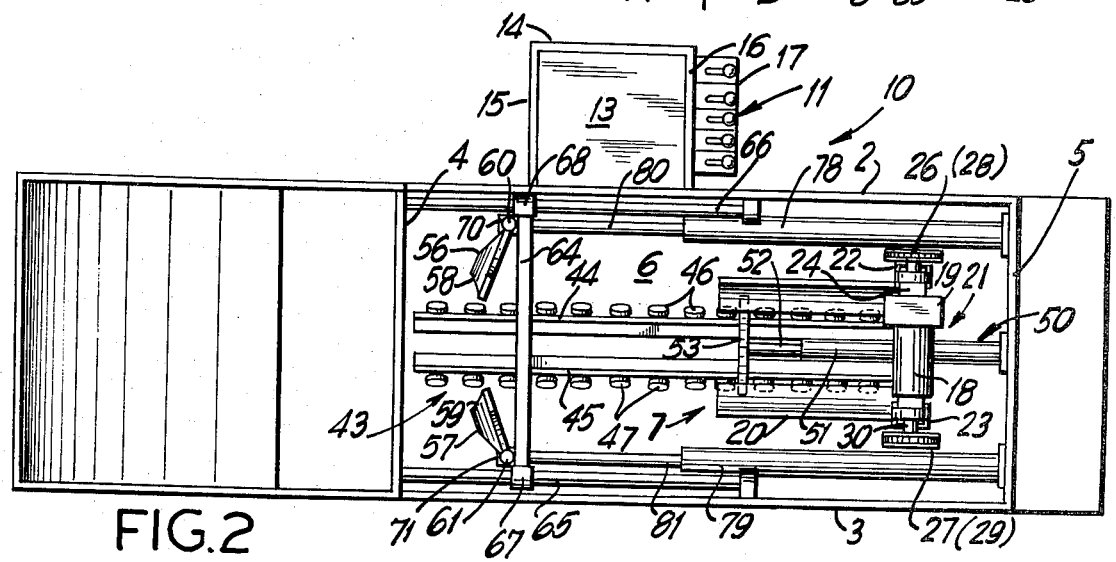
FIG. 2 is a top plan view of the apparatus of FIG. 1.

In accordance with the present invention, the pipe positioning apparatus of the present invention is shown in the accompanying drawings as it would appear on the surface of the ground. However, in operation the pipe positioning apparatus would be lowered, for example, by a crane, part of the way into a trench or hole. The upper portion of the apparatus would be exposed above the ground level and its lower portion would be placed within the trench or the hole.

As shown in FIGS. 1-4, the apparatus includes a body 10 having opposite side walls 2,3, end walls 4,5 and a bottom wall 6. An operator's platform 11 projects outwardly from the side wall 2. The platform 11 stands above the ground level and permits the operator to look downwardly (within the body 10 of the apparatus) while manipulating the pipe section 7 which is to be placed into position by the apparatus. The platform 11 includes a floor 13, a back wall 14 and two opposite side walls 15,16. An operator's console 17, fixed on the side wall 16, has a plurality of levers which operate hydraulic valves. The pressure for the hydraulic system is obtained from a hydraulic pressure motor (not shown) which operates from an electric motor or diesel or gasoline engine (not shown) and which may be external to the apparatus.

The pipe section 7 may typically be a section of precast concrete pipe with an outside diameter of 12¼ to 29 inches, and a weight of 122 to 870 pounds. The pipe section 7 is lifted and positioned on the pipe cradle 20 which rides on the pipe cradle elevator 21. The pipe cradle elevator comprises a hydraulic rotary motor 18 which operates gear reducer system 19; vertically aligned opposed side beams 22, 23; top and bottom cross-members, respectively 24, 25; and opposed elevator chains 26, 27 which run in geared wheels. The two top geared wheels 28, 29 are fixed on opposed ends of a rotatable shaft 30 and the two bottom geared wheels 31, 32 are fixed on opposite ends of a rotatable shaft 33 which is rotatable by its connection to the gear reducer system 19.

Figure 3:
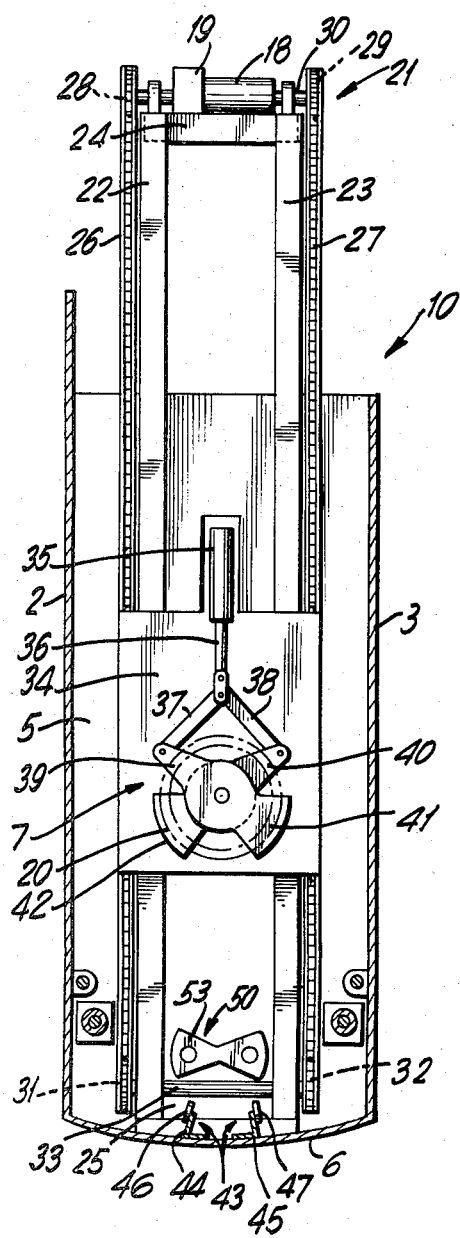
FIG. 3 is a cross-sectional view taken along line A—A of FIG. 1 and looking in the direction of the arrows.

The pipe cradle 20, as shown particularly in FIGS. 1 and 3, comprises a vertically aligned cradle base 34 whose upper and lower ends are attached to the chains 26, 27 so that the simultaneous vertical movement of the chains 26, 27 will either lift or lower the pipe cradle base 34. A hydraulic cylinder 35 having an extendable piston arm 36 is mounted on the pipe cradle base 34 and the piston arm 36 is pivotly connected with the lever arms 37, 38. The lever arms 37, 38 are connected to respective cross-arms 39, 40 which are pivotally mounted on the cradle base 34, so that the arms 39, 40 may be pivoted on the cradle base 34. The cross-arms 39, 40 have respective pipe-holding arms 41, 42 integral therewith and at right angles thereto. The pipe holding arms 41, 42 support the pipe section 7 when they are closed (brought closer together) by upward movement of the piston arm 36. The pipe holding arms 41, 42 are opened (separated) by downward movement of the piston arm 36 to permit the pipe section 7 to fall gently onto the horizontal track 43.

The horizontal track 43 comprises horizontally aligned opposed side frame members 44, 45 fixed to the bottom wall 6. A tandem series of freely rotatable wheels 46 is mounted on side member 44 and a similar tandem set of freely rotatable wheels 47 is mounted on side member 45. The wheels 46, 47 support the bottom of the pipe section and permit it to be moved into position so that it may be joined to a previously fixed and positioned pipe section.

The pipe section 7 is pushed forward, after it is dropped from the pipe cradle 20, by the horizontal push ram 50. The push ram 50 is a hydraulically operated ram consisting of horizontally aligned hydraulic cylinder 51 fixed to the body, an extendable piston arm 52, and a vertically aligned push plate 53 fixed at the outer end of the piston arm 52. The push plate 53, when the piston arm 52 is extended, pushes against the pipe section 7 and rolls it forward (away from the elevator) on the track 43.

Figure 4:
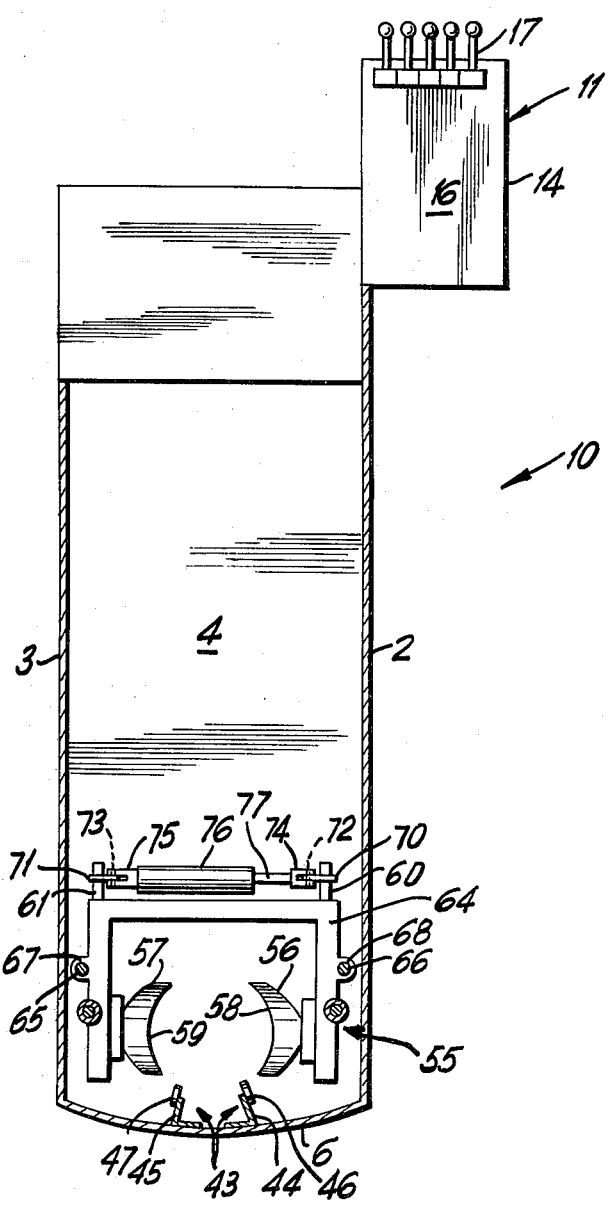
FIG. 4 is a cross-sectional view taken along line B—B of FIG. 1 and looking in the direction of the arrows.
Figure 5:
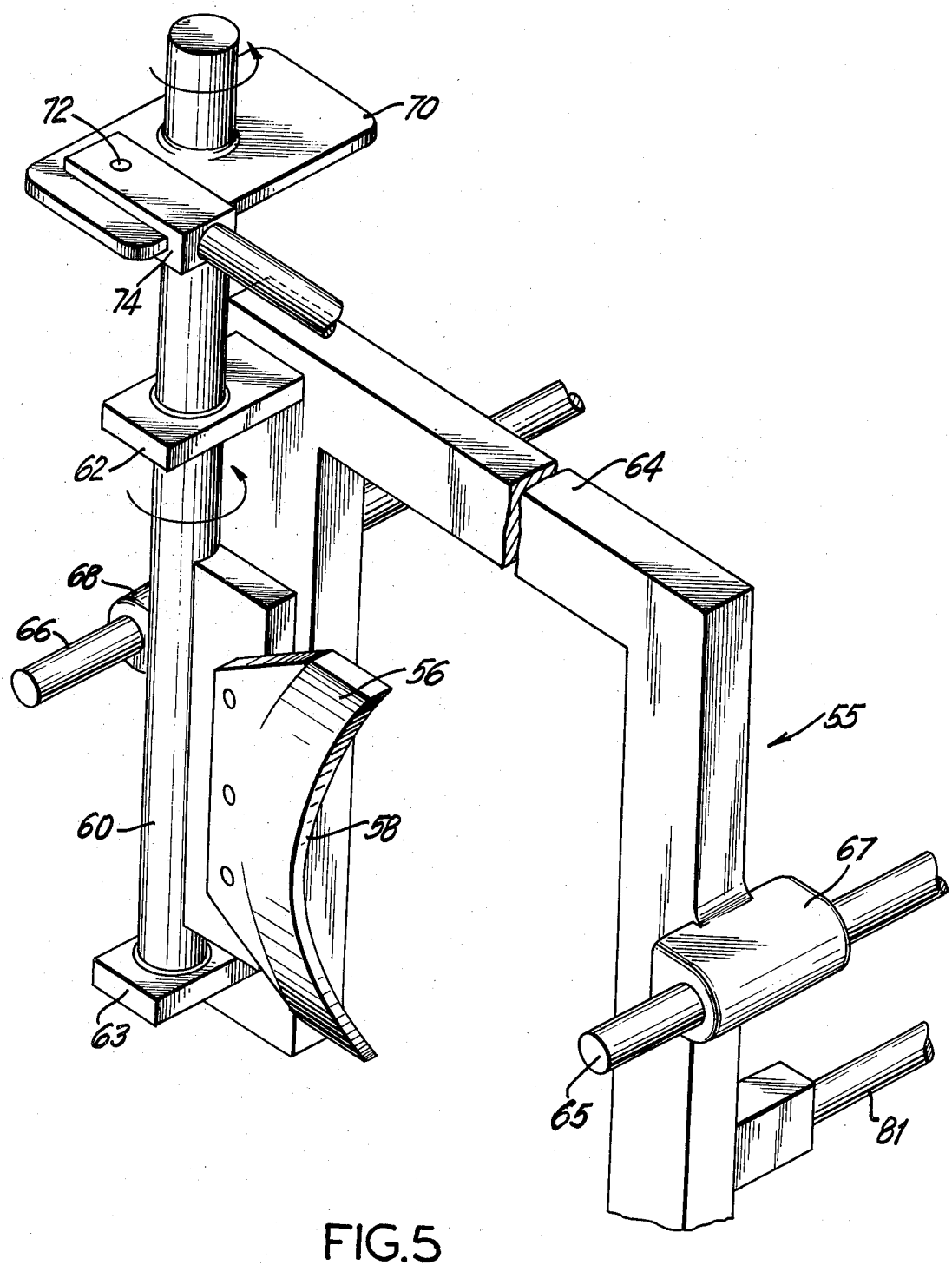
FIG. 5 is a perspective view, partially cut-away, showing the pipe clamp assembly utilized in the apparatus of the present invention.

When the pipe section 7 reaches a certain position, forward on the track 43, it is firmly gripped by the vertically aligned pipe clamp assembly 55, shown particularly in FIGS. 4 and 5. The pipe clamp assembly 55 includes opposed clamp members 56, 57, having an arcuate free edge, respectively 58, 59 which clamp the exterior of the pipe section 7. The clamp members 56, 57 are bowed (curved) plate members whose outer ends are straight and connected by bolts to plates attached to respective side rods 60, 61. The clamp members 56, 57 may be changed, depending on the size of the pipe section, so that their arcuate edges 58, 59 may match the curve of the pipe section. The side rods 60, 61 are each rotatably mounted in top and bottom bushings, the bushings being labeled 62, 63 in the case of side rod 60, see FIG. 5. The bushings 62, 63 and the bushing (not shown) for the side rod 61 are fixed to the vertical side portions of the inverted "U" shaped frame member 64.

The frame member 64, which is vertically aligned, is moved horizontally along two opposite and parallel horizontally aligned guide rods 65, 66.

The side rods 60, 61 have respective plates 70, 71 welded to them near their top ends, see FIG. 5. The plates 70, 71 have respective pins (bosses) 72, 73 which fit within bearing holes in respective bearing arms 74, 75 (plate 71, boss 73, not shown in FIG. 5). The inner ends of the bearing arms are pivotly connected, respectively, to a hydraulic cylinder 76 and its piston arms 77, see FIG. 4. When the hydraulic cylinder 76 is actuated, its piston arm 77 is extended and the bearing arms 74, 75 are moved outward (a separation movement), i.e., away from each other. Such separation movement of the bearing arms 74, 75 on the plates 70, 71, causes the side rods 60, 61 to rotate and opens up the clamp members 56, 57. Conversely, the withdrawal of the piston arm 77 closes the clamp members 56, 57 on the pipe section and securely holds the pipe section.

The frame member 64 slides horizontally on the guide rods 65, 66 which guide rods are within their encompassing respective bushings 67, 68, the bushings 67, 68 being fixed to the frame member 64. The frame member 64 is moved horizontally by the two opposed and parallel hydraulic cylinders 78, 79 whose respective piston arms 80, 81 are attached, at their outer ends, to the frame member 64, see FIG. 2.

In operation, the pipe section 7 is lowered by the elevator 21 and pipe cradle 20 into position on the track 43. The pipe section 7 is pushed horizontally forward by the operation of the push ram 50 until it is position to be gripped by the pipe clamp assembly 55. The clamp members 56, 57 are closed on the pipe section by operation of the hydraulic cylinder 76.

After the clamp members 56, 57 have securely gripped the pipe section 7, the frame member 64 is moved horizontally forward, at a controlled rate, by operation of the hydraulic cylinders 78, 79.

The pipe section 7 is positioned, accurately and with the desired pressure, on the pipe section (not shown) to which it is to be joined. The clamp members 56, 57 are opened and the frame member 64 and push ram 50 withdrawn to their original rearward position to await the next pipe section.

Modifications may be made in the present invention within the scope of the subjoined claims. For example, although the various power means are shown as hydraulic mechanisms, which are preferable, they may be replaced by electric motors and gear systems.

What is claimed is:

1. An apparatus for positioning pipe sections to be joined with a previously positioned pipe section, said apparatus comprising:

a body adapted to be positioned partially below ground level and having opposed side walls, end walls and a bottom wall;

an elevator connected within said body, a pipe cradle moved by said elevator and adapted to removably hold a pipe section, pipe cradle control means which under operator determination controls the pipe cradle to hold and release a pipe section, elevator motor means to operate said elevator and thereby raise and lower said pipe cradle, and elevator control means which under operator determination controls said elevator motor means;

a horizontally aligned track within said body and partly positioned beneath said elevator to receive and support a pipe section deposited from said pipe cradle, ram means within said body to move the pipe section along said track, ram motor means to operate said ram means, and ram control means which under operator determination controls said ram motor means;

a pipe clamp assembly within said body and positioned at least partially over said track to removably fasten on a pipe section, said pipe clamp assembly comprising clamp means to close and hold the pipe section and to open and release the pipe section, pipe clamp motor means to open and close said clamp means, pipe clamp control means which under operator determination controls the pipe clamp motor means, and pipe clamp assembly motion means which under operator control moves the pipe clamp assembly to position the clamped pipe section.

2. Apparatus for positioning pipe sections as in claim 1 wherein said pipe clamp assembly motor means includes pipe clamp assembly motor means to move said pipe clamp assembly in a horizontal direction and pipe clamp assembly control means which under operator determination controls said pipe clamp assembly motor means.

3. Apparatus for positioning pipe sections as in claim 2 and further comprising an operator's platform fixed to said body and adapted to support the operator, and an operator's control console fixed to said operator's platform and containing the pipe cradle control means, the elevator control means, the ram control means, the pipe clamp control means and the pipe clamp assembly control means.

4. Apparatus for positioning pipe sections as in claim 2 wherein said ram motor means, pipe clamp motor means, and said pipe clamp assembly motor means each comprises at least one hydraulic cylinder and piston arm.

5. Apparatus for positioning pipe sections as in claim 1 wherein said elevator motor means is a rotary hydraulic motor.

6. Apparatus for positioning pipe sections as in claim 1 wherein said body has a bottom wall and the track comprises a double row of freely rotatable wheels, each row of wheels being rotatably mounted in one of two parallel support members, said support members being fixed to said bottom wall.

7. An apparatus for positioning pipe sections to be joined with a previously positioned pipe section, said apparatus comprising:

a body adapted to be positioned partially below ground level and having opposed side walls and end walls;

an elevator connected within said body, a pipe cradle moved by said elevator and adapted to removably hold a pipe section, hydraulic pipe cradle motor means, pipe cradle control means which under operator determination controls the pipe cradle motor means to hold and release a pipe section, hydraulic elevator motor means to operate said elevator and thereby raise and lower said pipe cradle, and elevator control means which under operator determination controls said elevator motor means;

a horizontally aligned track within said body and partly positioned beneath said elevator to receive and support a pipe section deposited from said pipe cradle, ram means within said body to move the pipe section along said track, hydraulic ram motor means to operate said ram means, and ram control means which under operator determination controls said ram motor means;

a pipe clamp assembly within said body and positioned at least partially over said track to removably fasten on a pipe section, said pipe clamp assembly comprising clamp means to close and hold the pipe section and to open and release the pipe section, hydraulic pipe clamp motor means which under operator determination controls the pipe clamp means; and pipe clamp assembly motion means which under operator control moves the pipe clamp assembly to position the clamped pipe section; said pipe clamp assembly motion means including hydraulic pipe clamp assembly motor means to move said pipe clamp assembly in a horizontal direction and pipe clamp assembly control means which under operator determination controls said pipe clamp assembly motor means.

8. Apparatus for positioning pipe sections as in claim 7 and further comprising an operator's platform fixed to said body and adapted to support the operator, and an operator's control means fixed to said operator's platform and containing the pipe cradle control means, the elevator control means, the ram control means, the pipe clamp control means and the pipe clamp assembly control means.

* * * * *